3,194,726
ACRYLAMIDE CEMENTS
Ralph W. Baxendale, Rochester, N.Y., assignor to Eastman Kodak Company, Rochester, N.Y., a corporation of New Jersey
No Drawing. Filed Aug. 13, 1962, Ser. No. 216,281
11 Claims. (Cl. 161—227)

This application is a continuation-in-part of now abandoned copending application Serial No. 769,082, filed October 23, 1958, and entitled Improved Acrylamide Cements.

This invention concerns an acrylamide cement, more particularly a cement which may be used for adhering metal surfaces to other material such as glass, Bakelite, nylon, or the like.

It is difficult to cement materials, such as nylon, Mylar, glass, or the like to metallic surfaces such as aluminum or zinc. Many of the adhesives used in the past have been difficult to apply, have been sensitive to dry heat, and have been relatively inflexible in application.

As is well known in the art nylon is a polyamide resin such for example as polycaprolactam, polyhexamethylene adipamide (nylon 66) and polyhexamethylene sebacamide (nylon 68). Bakelite is a proprietary designation for resinous materials derived by condensing phenol and formaldehyde. Mylar is a proprietary designation for polyethylene terephthalate film.

I have discovered a cement or adhesive composition which can be used to adhere dyes to metallic surfaces, can be used to adhere materials which are highly resistant to cementing, and which can be used as a screw sealer, which will allow adjustment of the screw at first, then hold it tight against vibration.

One object of this invention is to provide a new acrylamide cement.

Another object of the invention is to provide a process for cementing materials, such as glass, Bakelite, nylon, dyes, and the like to metallic surfaces, such as aluminum and zinc.

A further object is to provide an adhesive which can be used as a pressure-sensitive cement which will permit the bond to be forced apart, and when pressed together, regain much of the original strength.

In accordance with this invention there is provided a novel cement or adhesive composition for use in bonding together similar and dissimilar materials.

The adhesive composition of this invention is comprised of acrylamide monomer, an inert solvent for the acrylamide monomer, and a novel polymerization catalyst. The novel polymerization catalyst of this invention is a metal such as aluminum, zinc, cadmium, antimony, manganese, and lead. In preparing the novel adhesive composition of this invention it is preferred to use the metal in finely divided form such, for example, as a powder. Mixture of two or more metals can be employed if desired. Of the above listed metals, aluminum and zinc are preferred.

The amount of metal powder employed in the cement or adhesive composition can be as much as about 10% by weight based on the weight of the acrylamide employed; however, it is preferred to employ the metal powder in a catalytic amount of from about 0.1% to about 2% by weight based on the weight of the acrylamide employed in the composition.

As is well known in the art, acrylamide is available as colorless, odorless crystals which have a melting point of about 85.5° C. The solid and solutions thereof are stable at room temperature; however, the solid acrylamide can be polymerized by melting.

Owing to the fact that acrylamide is a solid it is essential and important for the purposes of this invention that it be dissolved in a suitable solvent therefor in order to provide a satisfactory adhesive composition for application to members to be bonded therewith. Suitable solvents for this purpose include water, formamide, acetone, methanol, ethanol, isopropanol, butanol, and mixtures of two or more.

The amount of solvent employed can be varied over a relatively wide range; however, it has been determined that a highly satisfactory concentration range for the acrylamide is from about 100 grams to 500 grams per liter of solution. Thus, a satisfactory acrylamide solution for use in carrying out this invention can be comprised of, by weight, from about one part to five parts of acrylamide and from about nine parts to five parts of solvent.

Also, and in accordance with this invention, it has been determined that the polymerization of the acrylamide can be accelerated by incorporating in the adhesive composition the fluorosilicate ion. Suitable sources of fluorosilicate ion include magnesium fluorosilicate, sodium fluorosilicate, and potassium fluorosilicate. Mixtures of the above-mentioned fluorosilicate compounds can be employed if desired. The amount of fluorosilicate compound employed can be varied over a relatively wide range. It has been determined that, for the purposes of this invention, the amount of fluorosilicate compound that can be satisfactorily employed will be from about 0.25% to 1% by weight based on the weight of the acrylamide employed in the adhesive composition.

Other compounds that can be employed as polymerization accelerators include hydrochloric acid, hydrobromic acid, sulfuric acid, and m-benzene disulfonic acid. A preferred acid concentration is about 5 milliliters of hydrochloric acid or its equivalent per liter of solution.

Also, compounds such as sodium fluoride and potassium fluoride, which yield the fluoride ion in solution, can be added to the adhesive composition of this invention as an accelerator for polymerization.

If desired, a plasticizer such, for example, as glycerol can be incorporated in the composition to improve the flexibility of the bond. The preferred concentration range of plasticizer is about 1% to 20%, by weight, based on the weight of the acrylamide.

In accordance with this invention it has also been determined that if the surface to which adhesion is desired is one of the metals listed above which can be added to the acrylamide solution as a powder, the addition of the powder to the acrylamide can be omitted either entirely or in part, inasmuch as the metallic surface itself supplies sufficient catalyzation for the acrylamide monomer.

The following examples are illustrative of this invention.

*Example 1*

A solution of 400 g. acrylamide and 10 g. $MgSiF_6$ per liter in water was mixed with sufficient aluminum powder to form a paste. When this paste was spread between two sheets of glass, it set in 2 minutes to a firm rubbery bond and in 5 minutes to a solid bond.

*Example 2*

A solution of 400 g./l. of acrylamide in formamide was spread between plates of aluminum. A fairly firm bond existed in 5 minutes, and after 16 hours this had become strong and rubbery. When the plates were forced apart and then pressed together again, most of the original bond strength was restored. The unused cement was liquid after 48 hours.

*Example 3*

A solution of 400 g. acrylamide and 1 g. $MgSiF_6$ per liter in H₂O was applied between a glass and an aluminum plate. A very firm and quite solid bond was formed after 2 minutes. When the laminate was held 24 hours at 185° F. and 10 percent relative humidity, the cement remained strong; and the glass broke when an attempt was made to pry it off. The unused monomer solution remained unpolymerized after 48 hours.

*Example 4*

A solution of 400 g. acrylamide and 10 g. $MgSiF_6$ per liter in 1:9 glycerol-water was spread between a glass and an aluminum plate and allowed to stand 2 minutes. A firm, unyielding bond formed. After the plates were allowed to stand 24 hours at 185° F. and 10 percent relative humidity, the bond was still extremely strong. When the plates were pried apart, the glass split left a layer of glass adhering to the aluminum. The cement not exposed to the aluminum was still liquid 48 hours later.

*Example 5*

A sheet of clean aluminum was placed in a beaker containing an aqueous solution of 400 g. acrylamide and 10 ml. of 6 N hydrochloric acid per liter. After 10 minutes, the upper side of the plate was very sticky and a thick jelly was found underneath.

*Example 6*

A sheet of clean zinc was treated as in Example 5. After 10 minutes, the underside of the metal was covered with a jelly composed of polymer.

*Example 7*

One gram of granular aluminum was put into an aqueous solution of 400 g. acrylamide and 10 ml. of 6 N hydrochloric acid per liter. After 4 minutes, the aluminum was embedded in a tough, rubbery jelly lying at the bottom of the remaining nonviscous monomer solution.

*Example 8*

One gram of granular aluminum was placed in a solution of 400 g. acrylamide and 10 ml. of 6 N hydrochloric acid per liter in glycerine. After one minute, a jelly began forming around the aluminum. After 3 minutes, this jelly was fairly stiff and was very stiff after 10 minutes. The glycerine solution began to be stringy at 5 minutes and was very stringy after 10 minutes. After 20 minutes, the solution had set to a soft jelly and after 45 minutes, the whole mass had set to a stiff, rubbery jelly.

*Example 9*

Two aluminum plates 2 inches square were cleaned of oil. One plate was placed in a 400 ml. beaker and flowed with a solution of 2.5 g. acrylamide and 0.05 ml. of 6 N hydrochloric acid in 5 ml. of water. The second plate was placed on top of the first, and allowed to stand undisturbed. After 5 minutes, the plates were stuck together, and felt as if they were bonded with rubber. When the bonding layer was allowed to dry, the plates were found to be strongly and rigidly bonded together.

*Example 10*

A 2-inch square of aluminum was cleaned with pumice, placed in a 400 ml. beaker, and flowed with 5 ml. of an aqueous solution of 4 g. acrylamide and 0.1 ml. of 6 N hydrochloric acid per liter. After 5 minutes, the plate was removed, rinsed, and dried.

Drops of 1 percent water solutions of the following dyes were placed on the coating, left 15 seconds, and rinsed off.

(1) Brilliant green
(2) Methylene green
(3) Methylene blue
(4) Alizarin red S.
(5) Primuline
(6) Phenosafranin
(7) Pararosaniline acetate
(8) Victoria green All of these dyes mordanted strongly to the polymer coating.

*Example 11*

A 2-inch square of zinc was treated as in Example 10. After 10 minutes, the plate was removed, rinsed, dried, and tested. All of the dyes of Example 10 were found to be mordanted to the polyacrylamide layer.

*Example 12*

One gram of granular aluminum was placed in 5 ml. of an aqueous solution of 400 g. N-methylolacrylamide and 6.0 g. of m-benzene-disulfonic acid per liter. After 25 minutes, the grains of metal were bound together by a soft jelly.

*Example 13*

A solution of 400 g. acrylamide and 10 g. $Na_2SiF_6$ per liter in water was mixed with sufficient aluminum powder to form a paste. When this paste was spread between two sheets of glass, it set in two minutes to a firm rubbery bond and in 5 minutes to a solid bond.

*Example 14*

About 400 grams of acrylamide and 10 ml. of 6 N hydrochloric acid are dissolved in an amount of water sufficient to provide 1 liter of solution. To this solution is added about 1 gram of oil-free aluminum dust and the resulting composition thoroughly admixed to provide a thin slurry. Part of the slurry is spread between glass slides and the slides pressed together. The slides are bonded together in about 5 minutes.

*Example 15*

About 400 grams of acrylamide and about 10 grams of magnesium fluorosilicate are dissolved in water in an amount sufficient to provide a 1 liter solution. About 1 gram of oil-free aluminum dust is thoroughly admixed with the solution to provide a thin slurry. Part of this slurry is spread on a sheet of 5 mil thick polyethylene terephthalate. Immediately after the application of this slurry to a surface of the polyethylene terephthalate sheet there is placed thereon a second sheet of 5 mil thick polyethylene terephthalate and the two sheets are pressed together by hand. The two sheets are firmly bonded in a period of time of about 8 minutes.

*Example 16*

Example 15 is repeated with the exception there is employed zinc powder in place of the aluminum powder. Two sheets of polyethylene terephthalate are bonded together in a manner similar to that described in Example 15 and highly satisfactory bonding results are obtained.

*Example 17*

About 400 grams of acrylamide is dissolved in about 540 grams of water and about 60 grams of glycerol. About 10 grams of magnesium fluorosilicate is added to the acrylamide solution and the resulting composition is thoroughly admixed. The composition is used to bond together a member prepared from a phenol-formaldehyde resin and an aluminum member. The resulting bond is highly satisfactory and withstood 48 hours at 95° F. and 97% relative humidity, 24 hours at 185° F. and 10% relative humidity, and 8 hours at 0° F.

The cement or adhesive compositions of this invention can be applied to the surfaces of members to be bonded by spraying, brushing, rolling, whirling, or by any other conventional or convenient means known to the art. It is usually applied as a relatively thin film.

The adhesive composition of this invention can be used for bonding together glass, non-ferrous metals, plastics, rubber, wood, textile fabrics, paper, and the like. The compositions of this invention can be employed for adhering similar materials or dissimilar materials. Thus, for example, the materials being bonded together can both be plastic materials, glass, or non-ferrous metals. Further, the cement can be used to bond a non-ferrous metal to glass, a non-ferrous metal to plastic, glass to plastic, glass to rubber, and the like.

It is to be understood that the above description of this invention and the examples set forth hereinabove are illustrative of this invention and not in limitation thereof.

I claim:
1. A composition of matter for use in bonding together similar and dissimilar materials comprising
   (a) acrylamide monomer,
   (b) an inert solvent for the acrylamide monomer, and
   (c) a catalytic amount of a metal in finely divided form selected from the group consisting of aluminum, zinc, cadmium, antimony, manganese, lead, and mixtures thereof.
2. A composition of matter for use in bonding together similar and dissimilar metals comprising
   (a) acrylamide monomer,
   (b) water, and
   (c) from about 0.1% to 2% by weight based on the weight of the acrylamide monomer of aluminum metal in finely divided form.
3. A composition of matter for use in bonding together similar and dissimilar metals comprising
   (a) acrylamide monomer,
   (b) water, and
   (c) from about 0.1% to 2% by weight based on the weight of the acrylamide monomer of zinc metal in finely divided form.
4. A composition of matter for use in bonding together similar and dissimilar metals comprising
   (a) acrylamide monomer,
   (b) formamide, and
   (c) from about 0.1% to 2% by weight based on the weight of the acrylamide monomer of aluminum metal in finely divided form.
5. A composition of matter for use in bonding together similar and dissimilar materials comprising
   (a) acrylamide monomer,
   (b) an inert solvent for the acrylamide monomer,
   (c) from about 0.1% to 2% by weight based on the weight of the acrylamide monomer of aluminum metal in finely divided form, and
   (d) a compound selected from the group consisting of magnesium fluorosilicate, potassium fluorosilicate, and sodium fluorosilicate, said compound being present in the composition in an amount equal to from about 0.25% to 1% by weight based on the weight of the acrylamide monomer.
6. In the method of bonding together two non-ferrous solid members the steps which comprise
   (1) applying to a surface of at least one of said members a thin film of an adhesive composition comprising
      (a) acrylamide monomer,
      (b) an inert solvent for the acrylamide monomer, and
      (c) a catalytic amount of a metal in finely divided form selected from the group consisting of aluminum, zinc, cadmium, antimony, manganese, lead, and mixtures thereof,
   (2) bringing together the members to be bonded, and
   (3) polymerizing the acrylamide component of the applied film whereby a highly satisfactory bond is obtained between the two members.
7. In the method of bonding together two non-ferrous solid members the steps which comprise
   (1) applying to a surface of at least one of said members a thin film of an adhesive composition comprising
      (a) acrylamide monomer,
      (b) water, and
      (c) from about 0.1% to 2% by weight based on the weight of the acrylamide monomer of aluminum metal in finely divided form,
   (2) bringing together the members to be bonded, and
   (3) polymerizing the acrylamide component of the applied film whereby a highly satisfactory bond is obtained between the two members.
8. In the method of bonding together two non-ferrous solid members the steps which comprise
   (1) applying to a surface of at least one of said members a thin film of an adhesive composition comprising
      (a) acrylamide monomer,
      (b) formamide, and
      (c) from about 0.1% to 2% by weight based on the weight of the acrylamide monomer of aluminum metal in finely divided form,
   (2) bringing together the members to be bonded, and
   (3) polymerizing the acrylamide component of the applied film whereby a highly satisfactory bond is obtained between the two members.
9. In the method of bonding together two solid members at least one of said members being selected from the group consisting of aluminum, zinc, cadmium, antimony, manganese, and lead the steps which comprise,
   (1) applying to a surface of at least one of said members a thin film of a composition comprising acrylamide monomer and an inert solvent therefor
   (2) bringing together the members to be bonded, and
   (3) polymerizing the acrylamide component of the thin film whereby a highly satisfactory bond is obtained between the two members.
10. In the method of bonding together two solid members at least one of said members being selected from the group consisting of aluminum, zinc, cadmium, antimony, manganese, and lead the steps which comprise,
    (1) applying to a surface of at least one of said members a thin film of a composition comprising acrylamide monomer, magnesium fluorosilicate, and an inert solvent for the acrylamide monomer,
    (2) bringing together the members to be bonded, and
    (3) polymerizing the acrylamide component of the thin film whereby a highly satisfactory bond is obtained between the two members.
11. A laminated article comprising two solid members, at least one of said members being selected from the group consisting of aluminum, zinc, cadmium, antimony, manganese, and lead, bonded together by a thin film of polymerized acrylamide monomer.

References Cited by the Examiner
UNITED STATES PATENTS

| | | | |
|---|---|---|---|
| 2,387,243 | 10/45 | Castor | 260—37 |
| 2,598,663 | 6/52 | Kropa | 154—43 |
| 2,861,982 | 11/58 | Mino | 260—89.7 XR |
| 2,868,759 | 1/59 | Bechu | 260—418 |

EARL M. BERGERT, *Primary Examiner.*